(12) United States Patent
Soroushian

(10) Patent No.: US 6,488,865 B1
(45) Date of Patent: Dec. 3, 2002

(54) POLYMER ALLOYS WITH BALANCED HEAT STORAGE CAPACITY AND ENGINEERING ATTRIBUTES AND APPLICATIONS THEREOF

(75) Inventor: Parviz Soroushian, Lansing, MI (US)

(73) Assignee: Technova Corporation, Okemos, MI (US)

( * ) Notice: Subject to any disclaimer, the term of this patent is extended or adjusted under 35 U.S.C. 154(b) by 0 days.

(21) Appl. No.: 09/558,347

(22) Filed: Apr. 26, 2000

(51) Int. Cl.$^7$ ................................................. C09K 5/00
(52) U.S. Cl. ............................. 252/73; 525/7; 524/269; 524/525; 524/515
(58) Field of Search .............................. 252/73; 525/7; 524/269, 525, 515

(56) References Cited

U.S. PATENT DOCUMENTS

| | | | |
|---|---|---|---|
| 4,735,982 A | * 4/1988 | Orndorff, Jr. ................ | 524/269 |
| 4,777,211 A | 10/1988 | Lavengood et al. | |
| 4,954,546 A | 9/1990 | Abeler et al. | |
| 5,055,525 A | 10/1991 | Henton | |
| 5,194,494 A | 3/1993 | Henton | |
| 5,391,622 A | 2/1995 | Ho | |
| 5,777,030 A | 7/1998 | Hanes | |
| 6,207,761 B1 | * 3/2001 | Smith et al. ................ | 525/221 |
| 6,287,411 B1 | * 9/2001 | Kelley et al. ................ | 156/327 |

* cited by examiner

Primary Examiner—Mark Kopec
Assistant Examiner—D Hamlin

(57) ABSTRACT

A thermoplastic polymer of relatively low melt temperature is blended with at least one of thermosets, elastomers, and thermoplastics of relatively high melt temperature in order to produce a polymer blend which absorbs relatively high quantities of latent heat without melting or major loss of physical and mechanical characteristics as temperature is raised above the melting temperature of the low-melt-temperature thermoplastic. The polymer blend can be modified by the addition of at least one of fillers, fibers, fire retardants, compatibilisers, colorants, and processing aids. The polymer blend may be used in applications where advantage can be taken of the absorption of excess heat by a component which remains solid and retains major fractions of its physical and mechanical characteristics while absorbing relatively high quantities of latent heat.

7 Claims, No Drawings

POLYMER ALLOYS WITH BALANCED HEAT STORAGE CAPACITY AND ENGINEERING ATTRIBUTES AND APPLICATIONS THEREOF

This invention was made with U.S. government support under DE-FG0299ER82780 awarded by the U.S. Department of Energy. The U.S. government has certain rights in the invention.

BACKGROUND OF THE INVENTION

1. Field of the Invention

The invention is generally related to polymer alloys and their applications. Particularly, the invention is directed to making polymer alloys with high heat storage capacity within room temperature and adequate engineering attributes for use in building construction.

2. Description of the Relevant Art

Polymer blending has been subject of major efforts to develop new polymers of modified properties. U.S. Pat. No. 5,614,305 to Lavengood et al. discloses a blend of nylon with rubber with higher levels of impact resistance than nylon can provide. U.S. Pat. No. 4,954,546 to Abeler et al. discloses a blend of PVC with lauriltin compounds which provides improved stability upon prolonged exposure to light and heat. U.S. Pat. No. 5,055,525 discloses polymer blend compositions with improved toughness characteristics. U.S. Pat. No. 5,194,494 to Henton et al. discloses polymer blend compositions with improved resistance to heat. U.S. Pat. No. 5,391,622 to Ho et al. discloses polymer blends which exhibit high levels of electrical conductivity.

The above inventions are examples of those seeking to develop polymer blends with new combinations of properties. The polymer blend which is subject of this application is distinguished from all past inventions by the presence of thermoplastics of relatively low melt temperature (say, within the comfort range of room temperature) in the blend; said thermoplastics are absorb relatively large quantities of latent heat in the vicinity of their melt temperature. However, said thermoplastics have limited serviceability, because they soften and melt within room temperature. We have discovered that blending of said thermoplastics with thermosets or high-temperature thermoplastics can yield polymer blends with relatively high levels of strength and stiffness within room temperature (and even at elevated temperatures), where the low-melt-temperature thermoplastics still absorbs relatively large quantities of latent heat. Absorption of latent heat in said polymer blends is not accompanied with major loss of mechanical properties. Such novel polymer blends can be used in energy-efficient building construction, and also can find broader applications involving storage of excess heat.

SUMMARY OF THE INVENTION

It is an object of this invention to develop a polymer alloy with desirable physical and mechanical characteristics and relatively high heat storage capacity, that includes at least one low-melt-temperature thermoplastic capable of latent heat storage within the service temperature range and at least one thermoset (or high-melt temperature thermoplastic, or elastomer) to provide the blend with desirable physical and mechanical characteristics.

It is another object of this invention to develop polymer composites of desirable physical and mechanical characteristics and relatively high heat storage capacity, with at least one of fillers and fibers embedded within a polymer alloy that includes at least one low-melt-temperature thermoplastic capable of latent heat storage within the service temperature range.

It is another object of this invention to develop polymer alloys and composites with relatively high heat storage capacity, that remain solid within the service temperature range.

Applicant has discovered that low-melt-temperature thermoplastics, when blended with thermosets (or high-melt-temperature thermoplastics, or elastomers) can provide their latent heat storage capacity while the alloy remains solid in the vicinity of the melt temperature of said low-melt-temperature thermoplastic. Addition of fillers and reinforcement with fibers can enhance the physical and mechanical characteristics of the polymer alloy within the service range of temperature and also at elevated temperatures.

According to the invention, there is provided a polymer alloy where at least one low-melt-temperature thermoplastic provides relatively large latent heat storage capacity within the service range of temperature, and at least one of thermosets, high-melt-temperature thermoplastics, and elastomers are used in the alloy to ensure that the whole blend remains solid and provides desirable physical and mechanical characteristics within the service range of temperature. The polymer alloy can be refined through the addition of fillers, fibers, and other additives.

BRIEF DESCRIPTION OF THE DRAWINGS

None.

DETAILED DESCRIPTION OF THE PREFERRED EMBODIMENT OF THE INVENTION

Most materials store relatively small quantities of heat through temperature rise without phase change, and store relatively large quantities of (latent) heat with a relatively small temperature rise once they undergo phase change (e.g., melting). There are many applications where heat storage capacity of materials is an important design criterion. For example, materials capable of storage of relatively high quantities of heat within the comfort range of room temperature can benefit the energy-efficiency of buildings. There are also many electrical and mechanical applications where excess heat has to be removed (e.g., stored in other materials) within a certain temperature range in order to avoid over-heating.

Thermoplastics provide diverse melt temperatures. During melting, however, thermoplastics cease to retain the desirable physical and mechanical characteristics associated with the solid phase (e.g., strength and stiffness), and thus fail to meet such basic serviceability requirements as the ability to support or contain. The relatively high latent heat storage capacity of thermoplastics is therefore accompanied with loss of serviceability (stiffness, strength, etc.).

Applicant has discovered that blending of thermplastics of low melt temperature with thermosets (or high-melt-temperature thermoplastics, or elastomers) can yield a polymer alloy in which the low-melt-temperature thermoplastic provides its relatively high latent heat storage capacity while the thermoset (or high-melt-temperature thermoplastic, or elastomer) prevents the whole blend from melting or major loss of physical and mechanical characteristics as the melt temperature of the low-melt-temperature thermoplastic is exceeded. This polymer alloy can be modified by the addition of fillers, fibers, fire-retardants, compatibilisers, and other additives in order to tailor certain aspects of its processing and/or performance characteristics.

Different low-melt-temperautre thermoplastics, including polyethylene glycol, polycaprolactone triol, polycaprolactone diol, polyvinyl acetate, polybutyl methacrylate, poly n-butyl methacrylate, polylaurylactone, and polymethyl methacrylate can be used in the polymer alloys for latent heat storage within the service temperature of particular applications. In the case of applications with elevated service temperature, one can use thermoplastics such as acrylics and (thermoplastic) polyesters for the purpose of latent heat absorption.

Different thermosets, including epoxies, polyesters, phenolics, silicones, urethanes and urea melamine can be used in conjunction with the low-melt-temperature thermoplastics in the polymer alloys. Elastomers such as natural rubbers, polyisoprenes, neoprenes, polysiloxanes, diisocyanate polyesters, and butadiene-styrene copolymers can also be used in conjunction with low-melt-temperature thermoplastics. Depending on the service temperature of particular applications, one can also use higher-melt-temperature thermoplastics such as acetals, cellulosics, and polycarbonates in conjunction with lower-melt-temperature thermoplastics.

When at least one of thermosets, elastomers and higher-melt-temperature thermoplastics are blended with low-melt-temperature thermoplastics, the resulting polymer alloy retains the relatively high latent heat storage capacity of the low-melt-temperature themoplastics, with the alloy remaining solid as the melt temperature of the low-melt-temperature thermoplastic is exceeded. The alloy is therefore capable of substantial latent heat storage while remaining solid upon temperature rise.

Alloys of low-melt-temperature thermoplastics with at least one of thermosets, elastomers and high-melt-temperature thermoplastics can be modified by the addition of fillers, fibers, fire retardants, compatibilisers, and other additives. The polymer alloys can also be subjected to different processing techniques suiting polymers and polymer composites, including compression molding, bulk molding, filament winding, hand lay-up, injection molding, pultrusion, extrusion, reaction injection molding, resin transfer molding, sheet molding, and spray deposition.

INVENTION AND COMPARISON EXAMPLES

Example 1

Molten polyethylene glycol with molecular weight of 900, with a melt temperature of about 25 degrees centigrade and latent heat storage capacity of about 110 Joules per gram (upon temperature rise from about 20 to 30 degrees centigrade), was mixed with a filled (thermoset) polyester (at 65% polyester:35% polyethylene glycol by weight) at a temperature of 30° C. The hardener for polyester was added after thorough mixing of the blend. The resulting polymer alloy was poured into a mold to assume the shape of a plate with a thickness of about 12 mm, and was allowed to cure at room temperature for a period of one week. The cured polymer alloy had the capacity to absorb about 25 Joules per gram of heat as temperature was raised from about 20 to 30 degrees centigrade. The tensile strength of the alloy was about 2 MPa and 1.5 MPa at about 20 and 30 degrees centigrade, respectively.

Example 2

Molten polyethylene glycol with melocular weight of 200, with a melt temperature of about 25 degrees centigrade and latent heat storage capacity of about 110 Joules per gram (upon temperature rise from qbou5 20 to 30 degrees centigrade) was mixed with a filled (thermoset) polyester (at 65% polyester:35% polyethylene glycol by weight) and 10% by total weight of discrete E-glass fibers with 10 micrometers diameter and 3.2 mm length at a temperature of 30° C. The hardener for polyester was added after thorough mixing of the blend. The resulting polymer alloy was poured into a sealed mold and processed through compression molding at a pressure of 5 MPa and a temperature of 60 degrees centigrade for a period of 6 minutes. The compression molded plate with a thickness of about 12 mm was then cooled to room temperature and allowed to cure for a period of one week. The cured polymer alloy had the capacity to absorb about 20 Joules per gram of heat as temperature was raised from about 20 to 30 degrees centigrade. The flexural strength of the alloy was about 4 MPa and 3 MPa at about 20 and 30 degrees centigrade, respectively.

I claim:

1. A method of producing polymer alloys capable of latent heat storage at temperatures below 100 degrees centigrade without melting, comprising the steps of:

mixing of at least one thermoplastic with melt temperature of less than 100 degrees centigrade with at least one other polymer selected from the group consisting of thermosets, elastomers, and thermoplastics with melt temperature of more than 100 degrees centigrade;

molding of the blend to assume the targeted geometry; and curing of the blend to develop physical and mechanical characteristics.

2. A method of producing polymer alloys according to claim 1, wherein said mixing step is accomplished using at least one of mixers and extruders at temperatures ranging from 10 degrees centigrade to 200 degrees centigrade.

3. A method of producing polymer alloys according to claim 1, wherein said molding step involves at least one of compression molding, bulk molding, filament winding, hand lay-up, injection molding, pultrusion, extrusion, reaction injection molding, resin transfer molding, sheet molding, and spray deposition.

4. A method of producing polymer alloys according to claim 1, wherein said curing steps is performed at temperatures ranging from 10 degrees centigrade to 300 degrees centigrade over time periods ranging from 1 second to 60 days.

5. A method of producing polymer alloys according to claim 1, wherein said molding and curing steps are combined.

6. A method of producing polymer alloys according to claim 1, wherein at least one of fibers, fillers, compatibilisers, fire retardants, colorants, and processing aids are added to at least one of the polymers prior to mixing.

7. A method of producing polymer alloys according to claim 1, wherein at least one of fibers, fillers, compatibilisers, fire retardants, colorants, and processing aids are added during at least one of the mixing, molding and curing steps.

* * * * *